(12) United States Patent
Baset et al.

(10) Patent No.: US 9,934,055 B2
(45) Date of Patent: *Apr. 3, 2018

(54) EVALUATING DISTRIBUTED APPLICATION PERFORMANCE IN A NEW ENVIRONMENT

(71) Applicant: International Business Machines Corporation, Armonk, NY (US)

(72) Inventors: Salman A. Baset, New York, NY (US); Hai Huang, White Plains, NY (US); Byung Chul Tak, Elmsford, NY (US); Chunqiang Tang, Ossining, NY (US); Long Wang, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 1030 days.

This patent is subject to a terminal disclaimer.

(21) Appl. No.: 13/970,226

(22) Filed: Aug. 19, 2013

(65) Prior Publication Data

US 2014/0172406 A1    Jun. 19, 2014

Related U.S. Application Data

(63) Continuation of application No. 13/715,480, filed on Dec. 14, 2012.

(51) Int. Cl.
G06F 9/455    (2006.01)
G06F 11/34    (2006.01)

(52) U.S. Cl.
CPC ...... *G06F 9/45558* (2013.01); *G06F 11/3409* (2013.01); *G06F 2009/4557* (2013.01); *G06F 2201/865* (2013.01)

(58) Field of Classification Search
None
See application file for complete search history.

(56) References Cited

U.S. PATENT DOCUMENTS

| | | | |
|---|---|---|---|
| 7,228,337 B1 * | 6/2007 | Bornstein | ......... H04L 29/12367 709/217 |
| 7,757,291 B2 | 7/2010 | Rochette et al. | |
| 7,774,762 B2 | 8/2010 | Rochette et al. | |
| 7,784,058 B2 | 8/2010 | Rochette et al. | |
| 8,239,840 B1 * | 8/2012 | Czymontek | ............... G06F 8/34 717/125 |

(Continued)

OTHER PUBLICATIONS

Van Tran et al., "Application Migration to Cloud: A Taxonomy of Critical Factors," *SECLOUD '11*, May 22, 2011, Honolulu, HI, pp. 22-28.

(Continued)

*Primary Examiner* — Omar Fernandez Rivas
*Assistant Examiner* — Herng-Der Day
(74) *Attorney, Agent, or Firm* — Louis Percello

(57) ABSTRACT

Evaluating the performance of an application when migrated from a first environment in which the application is currently executing to a different second environment includes generating a configuration file using data obtained from the application executing in the first environment, installing the configuration file in a virtual machine residing in the second environment, launching the application in the virtual machine after the installing, and obtaining a metric indicative of the performance from the virtual machine.

17 Claims, 5 Drawing Sheets

(56) References Cited

U.S. PATENT DOCUMENTS 8,443,365 B2 5/2013 Kumar
2011/0154331 A1* 6/2011 Ciano ................. G06F 9/45558
718/1

OTHER PUBLICATIONS

Wes Lloyd et al., "Migration of Multi-tier Applications to Infrastructure-as-a-Service Clouds: An Investigation Using Kernel-based Virtual Machines," *GRID '11*, 12th IEEE/ACM International Conference on Grid Computing, Sep. 21-23, 2011, copy consists of 8 unnumbered pages.
Skiver Al-Kiswany et al., "VMFlock: Virtual Machine Co-Migration for the Cloud," *HPDC '11*, Proceedings of the 20th International Symposium on High Performance Distributed Computing, New York, NY, Jun. 8-11, copy consists of 13 unnumbered pages.

* cited by examiner

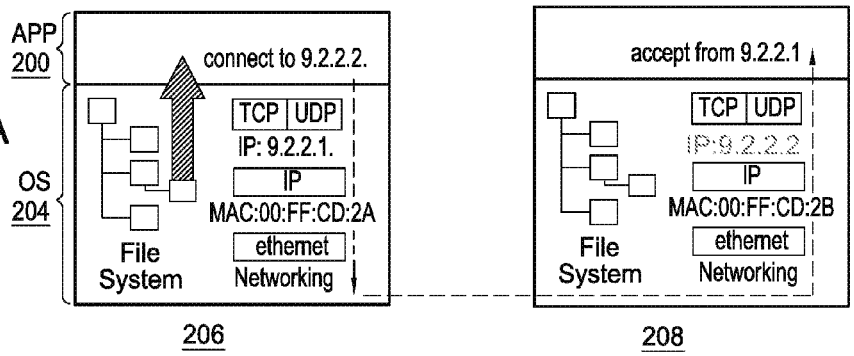
FIG. 2A (Before migration)
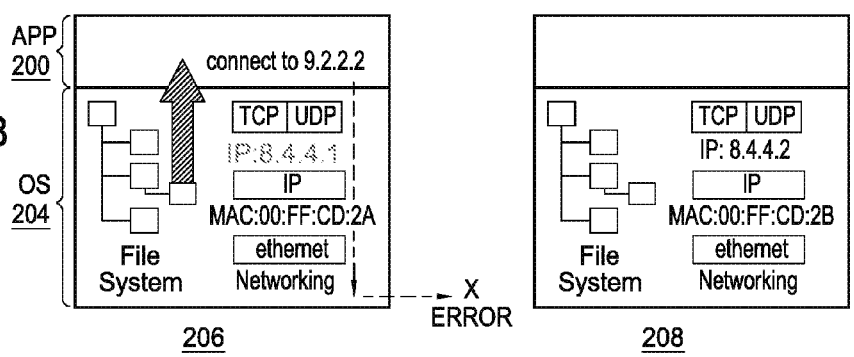
FIG. 2B (After migration)
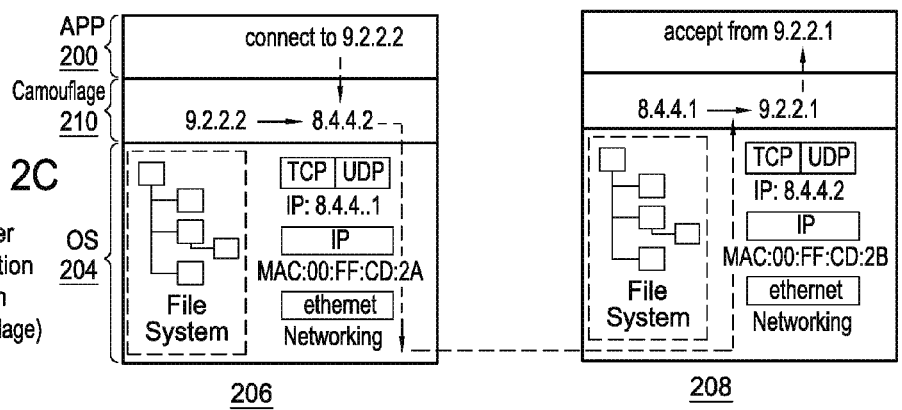
FIG. 2C (After migration with camouflage)

EVALUATING DISTRIBUTED APPLICATION PERFORMANCE IN A NEW ENVIRONMENT

CROSS REFERENCE TO RELATED APPLICATIONS

This application is a continuation of U.S. patent application Ser. No. 13/715,480, filed Dec. 14, 2012, which is herein incorporated by reference in its entirety.

BACKGROUND OF THE INVENTION

The present invention relates generally to data migration and relates more specifically to the migration of distributed applications.

A distributed application is an application in which presentation, application processing, and data management are performed as logically separate processes over multiple cooperating servers. These servers might include, for example, one or more hypertext transfer protocol (HTTP) servers, application servers, and/or relational database management systems.

When a distributed application is to be migrated to a new environment (e.g., a cloud environment), it is often difficult to estimate how the application will perform in the new environment. For example, some software packages may conflict with each other in the new environment and negatively impact application performance. However, it is difficult to accurately estimate the application's performance in the new environment without actually installing and configuring the application in the new environment. Although the distributed application could be completely re-installed and re-configured in the new environment, this approach is not ideal for several reasons. For one, installation is complicated by the subtle interdependencies between the application tiers, potentially complex configurations, and application specific treatments. Moreover, it is costly and labor-intensive to migrate and store all of the data associated with a distributed application.

Other approaches that avoid completely re-installing the distributed application in the new environment have drawbacks as well. For instance, micro-benchmarks could be run in the current environment and the new environment to learn performance differences, and performance models could then be built for the current environment and translated into the new environment using the micro-benchmarks. However, the weaknesses of the selected modeling technique carry over into the results, and the model translation introduces inaccuracies as well. Alternatively, the application could be profiled in-depth to construct a straw man application that mimics the application's resource consumption. However, it is difficult to accurately mimic certain resource consumption and execution behaviors such as thread synchronization and memory usage.

SUMMARY OF THE INVENTION

Evaluating the performance of an application when migrated from a first environment in which the application is currently executing to a different second environment includes generating a configuration file using data obtained from the application executing in the first environment, installing the configuration file in a virtual machine residing in the second environment, launching the application in the virtual machine after the installing, and obtaining a metric indicative of the performance from the virtual machine.

Thus, embodiments of the present invention replicate an execution environment in the target environment to which an application is to be migrated. This is achieved by intercepting system library invocations and modifying the input/output parameters and return values. The unmodified application binary is used directly.

BRIEF DESCRIPTION OF THE DRAWINGS

So that the manner in which the above recited features of the present invention can be understood in detail, a more particular description of the invention may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 2A-2C are block diagrams illustrating one embodiment of a technique for replicating network settings, according to the present invention;

DETAILED DESCRIPTION

In one embodiment, the invention is a method and apparatus for evaluating distributed application performance in a new environment. Embodiments of the invention replicate the application's original execution environment in a new set of servers and use the application binary to drive performance measurement. In particular, the replicated environment includes the network Internet Protocol (IP) configurations, library files, directory structure, user accounts, environment variables, and the like of the original environment, which allows the application binary to execute correctly. Accurate performance metrics can be obtained from successful deployment of the application in the replicated environment, because the application will consume resources in the replicated environment in the same manner that it would consume resources in the original environment. This will allow all of the execution intricacies (e.g., central processing unit (CPU) caching effects, thread synchronization, and the like) to manifest.

Figure 1:
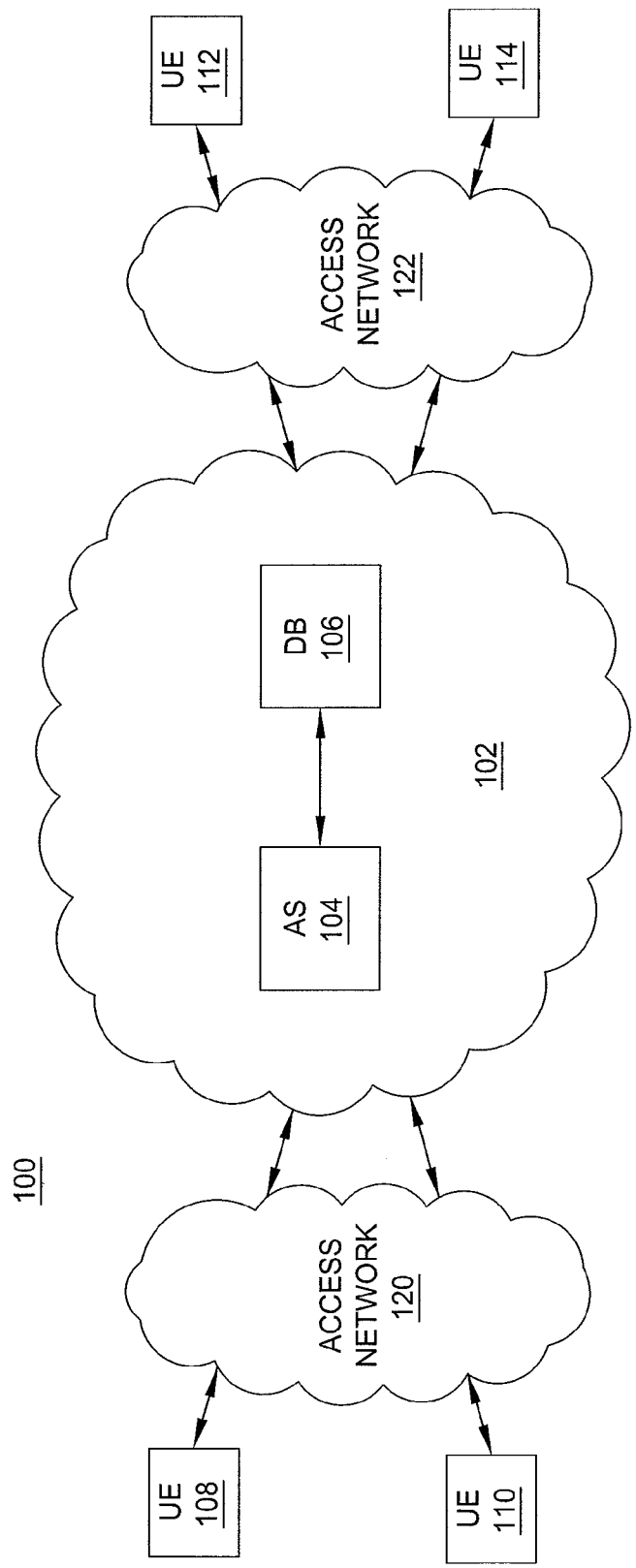
FIG. 1 is a block diagram depicting one example of a network within which embodiments of the present invention may be deployed.

FIG. 1 is a block diagram depicting one example of a network 100 within which embodiments of the present invention may be deployed. The network 100 may be any type of communications network, such as for example, an Internet Protocol (IP) network (e.g., an IP Multimedia Subsystem (IMS) network, an asynchronous transfer mode (ATM) network, a wireless network, a cellular network, a long term evolution (LTE) network, and the like). An "IP network" is broadly defined as a network that uses Internet Protocol to exchange data packets. Additional exemplary IP networks include Voice over IP (VoIP) networks, Service over IP (SoIP) networks, and the like.

In one embodiment, the network 100 may comprise a core network 102. The core network 102 may be in communication with one or more access networks 120 and 122. The access networks 120 and 122 may include a wireless access network (e.g., a WiFi network and the like), a cellular access network, a cable access network, a wired access network and the like. In one embodiment, the access networks 120 and 122 may all be different types of access networks, may all be the same type of access network, or some access networks may be the same type of access network and other may be different types of access networks. The core network 102 and the access networks 120 and 122 may be operated by different service providers, the same service provider or a combination thereof.

In one embodiment, the core network 102 may include an application server (AS) 104 and a database (DB) 106. Although only a single AS 104 and a single DB 106 are illustrated, it should be noted that any number of application servers 104 or databases 106 may be deployed. For instance, the core network 102 may comprise a portion of a cloud environment in which services and applications are supported in a highly distributed manner.

Figure 5:
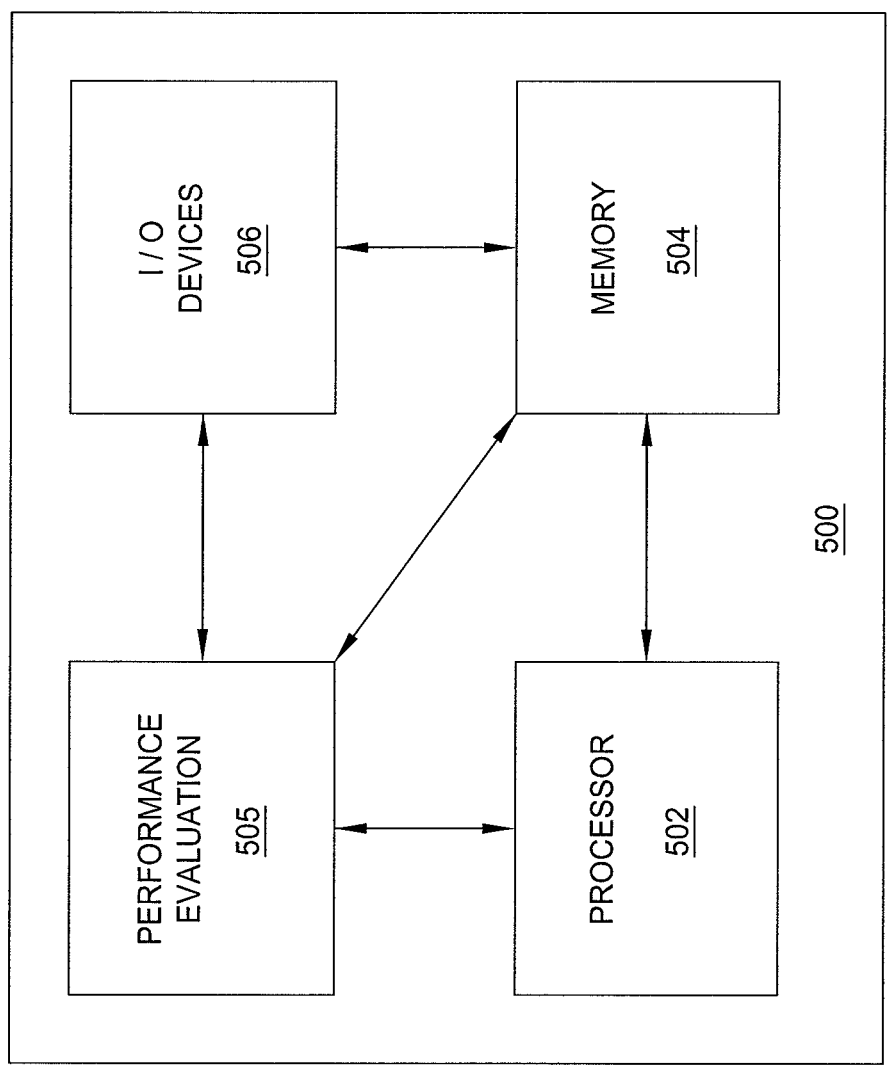
FIG. 5 is a high-level block diagram of the performance evaluation method that is implemented using a general purpose computing device.

In one embodiment, the AS 104 may comprise a general purpose computer as illustrated in FIG. 5 and discussed below. In one embodiment, the AS 104 may perform the methods and algorithms discussed below related to evaluating distributed application performance. For instance, the AS 104 may initiate migration of an application and/or maintain IP binding states.

In one embodiment, the DB 106 stores data relating to the distributed applications(s) being migrated. For instance, the DB 106 may store input and output parameters for system calls, file system settings, user account settings, and environment variables, among other data. Although only one DB 106 is illustrated, the network 100 may include multiple databases.

In one embodiment, the access network 120 may be in communication with one or more user endpoint devices (also referred to as "endpoint devices" or "UE") 108 and 110. In one embodiment, the access network 122 may be in communication with one or more user endpoint devices 112 and 114.

In one embodiment, the user endpoint devices 108, 110, 112 and 114 may be any type of endpoint device that is capable of accessing services from a cloud-based service provider, such as a desktop computer or a mobile endpoint device such as a cellular telephone, a smart phone, a tablet computer, a laptop computer, a netbook, an ultrabook, a portable media device (e.g., an MP3 player), a gaming console, a portable gaming device, and the like. It should be noted that although only four user endpoint devices are illustrated in FIG. 1, any number of user endpoint devices may be deployed.

It should be noted that the network 100 has been simplified. For example, the network 100 may include other network elements (not shown) such as border elements, routers, switches, policy servers, security devices, a content distribution network (CDN) and the like.

As discussed above, embodiments of the invention replicate the application's original execution environment, including network settings and file system settings, in a new set of servers. In one embodiment, the network settings are replicated via a software layer introduced between the application and the kernel that replaces input parameters and outputs of selected system calls that are related to network setup and tear-down. In a further embodiment, the file system settings are replicated by packaging the files accessed by the application and copying them over to the new servers. The new environment is also updated to match user account settings and environment variables.

FIGS. 2A-2C are block diagrams illustrating one embodiment of a technique for replicating network settings, according to the present invention. In particular, the illustrated technique provides the illusion of an execution environment that is identical to the original execution environment by intervening at the interaction point between the application and the operating system.

FIG. 2A illustrates the operation of an exemplary application 200 prior to migration, in an original execution environment. As illustrated, the application 200 operates in conjunction with an operating system 204 that includes a file system and a network stack. In accordance with the application 200, a first server 206 may wish to communicate with a second server 208. Prior to migration, the first server 206 has an exemplary IP address of 9.2.2.1, whereas the second server 208 has an exemplary IP address of 9.2.2.2. Thus, when the first server 206 wishes to connect to the second server 208, the first server 206 sends a message with the expected destination IP address of 9.2.2.2 to initiate the connection. The second server 208 expects or recognizes the message from the IP address 9.2.2.1 and accepts the message to establish the connection.

FIG. 2B illustrates the operation of the exemplary application 200 after migration to a new execution environment. As illustrated, the migration has resulted in changes to the IP addresses of the first server 206 and the second server 208 (specifically, the virtual machines that emulate the first server 206 and the second server 208 in the new execution environment have new, different IP addresses). In particular, the first server's IP address has changed from 9.2.2.1 to 8.4.4.1, and the second server's IP address has changed from 9.2.2.2. to 8.4.4.2. However, the servers 206 and 208 may not be aware of each other's new IP addresses. Thus, when the first server 206 sends a message with the expected destination IP address of 9.2.2.2 to initiate the connection, the connection attempt will experience an error. The IP address 9.2.2.2 does not exist in the new execution environment. Moreover, the second server 208 will not expect or recognize the message from IP address 8.4.4.1.

FIG. 2C illustrates operation of the exemplary application 200 after migration and implementing techniques of the present invention. In this instance, a camouflage layer 210 is interposed between the application 200 and the operating system 204 in the replicated application. The camouflage layer 210 comprises software and/or hardware that intercepts system calls and replaces the actual values involved in the system calls with expected values, thereby creating the illusion that the execution environment has not changed and making the migration transparent to the application 200.

For instance, referring to the error example illustrated in FIG. 2B, the camouflage layer 210 will intercept the first server's message and translate the expected destination IP address of 9.2.2.2 to the second server's new IP address of 8.4.4.2. Similarly, when the message is received by the second server 208, the camouflage layer 210 will intercept the first server's message and translate the first server's new IP address of 8.4.4.1 to the expected source IP address of 9.2.2.1. In one embodiment, network address translation is provided at the library level, rather than by the network stack. For instance, local IP addresses can be translated by intercepting input/output control system calls (e.g., using the ioctl(SIOCGIFFLAGS) command in Linux); network endpoints can be translated by retrieving locally bound names or peer addresses of specified sockets (e.g., using the getsockname( ) or getpeername( ) commands in Linux); host names can be translated by intercepting strings naming the current systems (e.g., using the uname( ) command in Linux); and domain name system lookups may be translated by retrieving host information from a database (e.g., using the gethostname( ) command in Linux).

Moreover, as illustrated, the file systems illustrated in FIG. 2C are enclosed within a dashed box. This dashed box indicates that the file systems have been "jailed" after being copied over from the original execution environment to the new execution environment (for example, using the UNIX chroot operation to disguise the file systems). In one embodiment, however, special file systems such as process files (e.g., /proc), device files (e.g., /dev), and non-process related system files (e.g., /sys) are mounted (i.e., made accessible) from the new virtual machine rather than migrated from the original execution environment.

Thus, the present invention intercepts application-operating system interactions after server replication and modifies data in these interactions (e.g., IP addresses and host names) in order to provide the illusion that the execution environment has not changed. The application is thus allowed to continue using the original IP addresses and host names from the pre-replication/migration execution environment. The locations of all configuration files and data files remain unchanged, and environment variables are reproduced.

It will be appreciated that although FIGS. 2A-2C illustrate embodiments of the invention within the exemplary context of a connection operation, the same techniques illustrated in FIG. 2C may be implemented to facilitate other operations as well (e.g., detecting one's own IP address, for instance).

Figure 3:
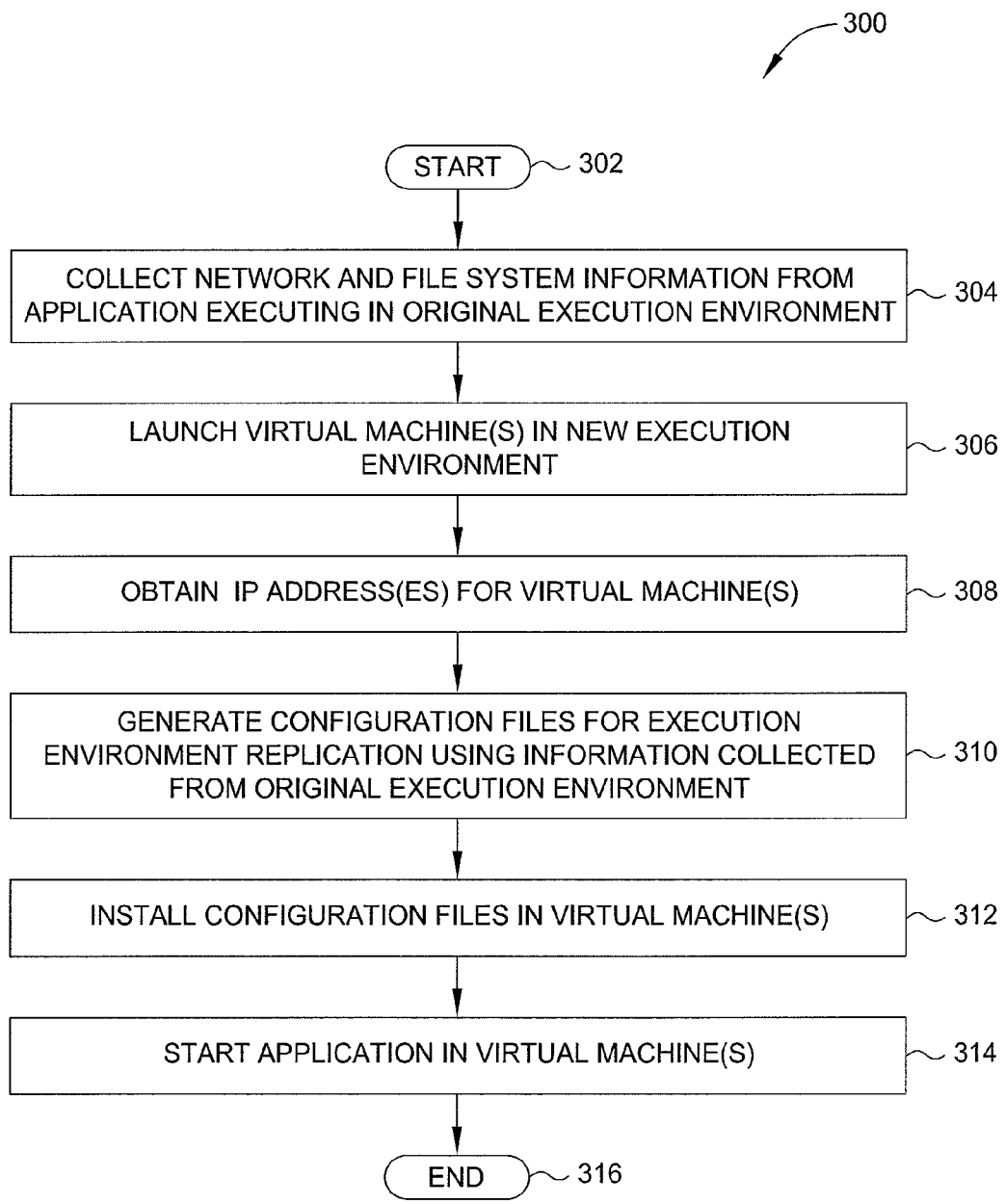
FIG. 3 is a flow diagram illustrating one embodiment of a method for automatically replicating a distributed application in a new environment, according to embodiments of the present invention.

FIG. 3 is a flow diagram illustrating one embodiment of a method 300 for automatically replicating a distributed application in a new environment, according to embodiments of the present invention. In particular, the method 300 replicates an application to be migrated by including a camouflage layer in the replicated application, as illustrated in FIG. 2C. In one embodiment, the method 300 is executed by the AS 104, which in this case manages the migration of the application by collecting data from the original execution environment, generating new configuration files, and launching new virtual machines in the new execution environment.

The method 300 begins in step 302. In step 304, the AS 104 collects network and file system information from the application executing in the original execution environment. In one embodiment, the network and file system information includes input and output parameters for system calls, file system settings, user account settings, and environment variables, among other data. In one embodiment, the AS 104 stores this information in the DB 106.

In step 306, the AS 104 launches one or more new virtual machines in the new execution environment. The virtual machines emulate the servers that are deployed in the original execution environment and may be launched according to any known technique.

In step 308, the AS 104 obtains the IP addresses for the virtual machines. These IP addresses may also be stored in the DB 106.

In step 310, the AS 104 generates configuration files for the execution environment replication using the old IP addresses (of the servers residing in the original execution environment) and the new IP addresses (of the virtual machines launched in the new execution environment).

In step 312, the AS 104 installs the configuration files in the virtual machines. The AS 104 then starts the application in each of the virtual machines in step 314. In step 316, the method 300 ends.

The method 300 thus replicates the original execution environment in a new set of servers in the new execution environment. Successful deployment of the application in the replicated environment allows one to obtain accurate performance metrics, because the replicated servers will consume resources in the same manner that they would in the original execution environment.

The method 300 may be executed during the initial migration of an application or even after migration in order to facilitate on-going post-migration management. Where an initial migration is being performed, the method 300 may be implemented during a complete migration (i.e., in which all application components are migrated) or a partial migration (e.g., an incremental migration of application components, or a migration in which only a subset of the components is migrated). The method 300 may also be implemented during initial migrations that migrate the entire application to a single cloud, that migrate different portions of the application to multiple different clouds, or that maintain some portions of the application in-house (e.g., in the original execution environment) and migrate other portions of the application to one or more clouds.

Where ongoing management of an already migrated application is being performed, the method 300 may be used to perform migration between clouds (e.g., including redistribution of application components across multiple clouds for application optimization) or to facilitate new interactions between applications that employ a camouflage layer such as that disclosed (e.g., application components may be migrated to separate clouds after a period of interaction).

Figure 4:
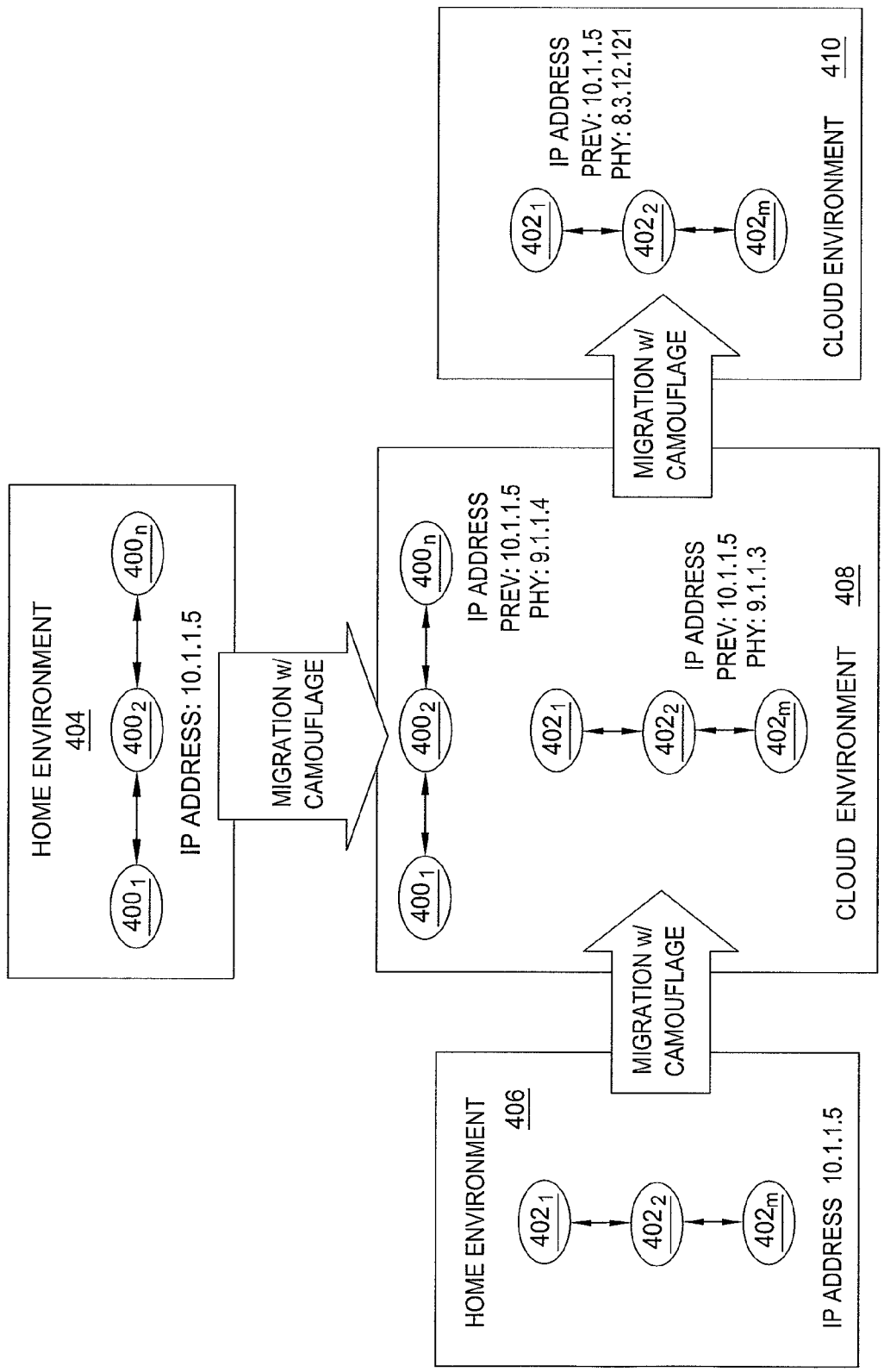
FIG. 4 is a block diagram illustrating one embodiment of a technique for handling new interactions and/or subsequent migrations of an application, according to the present invention.

FIG. 4 is a block diagram illustrating one embodiment of a technique for handling new interactions and/or subsequent migrations of an application, according to the present invention. In particular, FIG. 4 illustrates a technique for resolving a conflict between two migrated applications having the same IP address.

FIG. 4 thus includes a first application comprising a first plurality of servers $400_1$-$400_n$ (collectively referred to as "first application 400") and executing in a first home environment 404 and a second application comprising a second plurality of servers $402_1$-$402_m$ (collectively referred to as "second application 402") and executing in a second home environment 406. The first application 400 and the second application 402 are both migrated from their respective home environments to a first cloud environment 408; subsequently, the second application 402 is migrated to a second cloud environment 410. Although not illustrated, each of the first home environment 404, the second home environment 406, the first cloud environment 408, and the second cloud environment 410 further includes a server such as the AS 104 operating in accordance with the method 300.

As illustrated, in their respective home environments, server $400_2$ of the first application 400 and server $402_2$ the second application 402 have the same exemplary IP address (i.e., 10.1.1.5). However, when migrated to the first cloud environment 408, the server $400_2$ and the server $402_2$ are both assigned new IP addresses (i.e., 9.1.1.4 and 9.1.1.3, respectively) to resolve this conflict. Thus, after the first migration of both applications 400 and 402 to the first cloud environment 408, the server $400_2$ sees the IP address of the server $402_2$ as 9.1.1.3, while the server $402_2$ sees the IP address of the server $400_2$ as 9.1.1.4.

However, when the second application 402 is subsequently migrated to the second cloud environment 410, the first application 400 remains in the first cloud environment 408. The servers $402_1$-$402_m$ of the second application 402 are assigned new IP addresses; the exemplary new IP address for the server $402_2$ is 8.3.12.121. The AS 104 operating in the first cloud environment. The AS 104 operating in the second cloud environment 410 knows the new IP addresses for the servers $402_1$-$402_m$ and updates the IP maps in the second application's configuration files accordingly.

FIG. 5 is a high-level block diagram of the performance evaluation method that is implemented using a general purpose computing device 500. In one embodiment, a general purpose computing device 500 comprises a processor 502, a memory 504, a performance evaluation module 505 and various input/output (I/O) devices 506 such as a display, a keyboard, a mouse, a stylus, a wireless network access card, an Ethernet interface, and the like. In one embodiment, at least one I/O device is a storage device (e.g., a disk drive, an optical disk drive, a floppy disk drive). It should be understood that the performance evaluation module 505 can be implemented as a physical device or subsystem that is coupled to a processor through a communication channel.

Alternatively, the performance evaluation module 505 can be represented by one or more software applications (or even a combination of software and hardware, e.g., using Application Specific Integrated Circuits (ASIC)), where the software is loaded from a storage medium (e.g., I/O devices 506) and operated by the processor 502 in the memory 504 of the general purpose computing device 500. Thus, in one embodiment, the performance evaluation module 505 for evaluating application performance in a new environment, as described herein with reference to the preceding figures, can be stored on a computer readable storage medium (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying figures that recite a determining operation or involve a decision, do not necessarily require that both branches of the determining operation be practiced. In other words, one of the branches of the determining operation can be deemed as an optional step.

While the foregoing is directed to embodiments of the present invention, other and further embodiments of the invention may be devised without departing from the basic scope thereof. Various embodiments presented herein, or portions thereof, may be combined to create further embodiments. Furthermore, terms such as top, side, bottom, front, back, and the like are relative or positional terms and are used with respect to the exemplary embodiments illustrated in the figures, and as such these terms may be interchangeable.

What is claimed is:

1. A non-transitory computer readable storage medium that stores instructions for evaluating a performance of an application when migrated from a first computing environment in which the application is currently executing to a different second computing environment, where the instructions, when executed, cause a processor to perform operations comprising:

generating a configuration file using data obtained from the application executing in the first computing environment, wherein the application is a distributed application in which presentation, application processing, and data management are performed as logically separate processes over a plurality of cooperating servers residing in the first computing environment;

installing the configuration file in a plurality of virtual machines residing in the second computing environment, wherein each virtual machine of the plurality of virtual machines emulates a corresponding server of the plurality of cooperating servers residing in the first computing environment, and wherein the second computing environment is a cloud computing environment;

launching the application in the plurality of virtual machines after the installing, wherein for each virtual machine of the plurality of virtual machines a camouflage layer interposed between the application executing on each virtual machine and an operating system of each virtual machine uses the configuration file to intercept messages exchanged between the application executing on each virtual machine and the operating system and to modify the messages by translating an old Internet Protocol address associated with the corresponding server in the first computing environment into a new Internet Protocol address associated with each virtual machine residing in the second computing environment, wherein the application in the second computing environment continues to use the old Internet Protocol address and an old host name used by the application in the first computing environment, and the camouflage layer intercepts the messages and modifies the messages in a manner that is transparent to the application in the second computing environment; and obtaining a metric indicative of the performance of the application from the plurality of virtual machines.

2. The non-transitory computer readable storage medium of claim 1, wherein the data comprises network information and file system information.

3. The non-transitory computer readable storage medium of claim 2, wherein the network information comprises input and output parameters for system calls.

4. The non-transitory computer readable storage medium of claim 2, wherein the file system information comprises file system settings.

5. The non-transitory computer readable storage medium of claim 2, wherein the file system information comprises user account settings.

6. The non-transitory computer readable storage medium of claim 2, wherein the network information comprises environment variables.

7. The non-transitory computer readable storage medium of claim 2, wherein the network information comprises Internet Protocol configurations.

8. The non-transitory computer readable storage medium of claim 1, wherein the configuration file further replaces an input parameter of a system call of the application that is related to network setup and tear-down.

9. The non-transitory computer readable storage medium of claim 1, wherein the configuration file further replaces an output of a system call of the application that is related to network setup and tear-down.

10. The non-transitory computer readable storage medium of claim 1, wherein the operations further comprise:

copying a file accessed by the application from the first computing environment to a server residing in the second computing environment.

11. The non-transitory computer readable storage medium of claim 1, wherein the first computing environment is a computing environment other than a cloud computing environment.

12. The non-transitory computer readable storage medium of claim 1, wherein the first computing environment is a cloud computing environment.

13. The non-transitory computer readable storage medium of claim 1, wherein the second computing environment comprises a plurality of different cloud computing environments to which different portions of the application are migrated.

14. The non-transitory computer readable storage medium of claim 1, wherein a migration of the application from the first computing environment to the second computing environment results in a new interaction between the application and another application.

15. The non-transitory computer readable storage medium of claim 1, wherein the configuration file is implemented in a combination of software and hardware.

16. The non-transitory computer readable storage medium of claim 1, wherein the configuration file makes it appear to the application executing in the second computing environment that the application continues to execute in the first computing environment.

17. A system for evaluating a performance of an application when migrated from a first computing environment in which the application is currently executing to a different second computing environment, the system comprising:
   a processor; and
   a computer readable storage medium that stores instructions which, when executed, cause the processor to perform operations comprising:
      generating a configuration file using data obtained from the application executing in the first computing environment, wherein the application is a distributed application in which presentation, application processing, and data management are performed as logically separate processes over a plurality of cooperating servers residing in the first computing environment;
      installing the configuration file in a plurality of virtual machines residing in the second computing environment, wherein each virtual machine of the plurality of virtual machines emulates a corresponding server of the plurality of cooperating servers residing in the first computing environment, and wherein the second computing environment is a cloud computing environment;
      launching the application in the plurality of virtual machines after the installing, wherein for each virtual machine of the plurality of virtual machines a camouflage layer interposed between the application executing on each virtual machine and an operating system of each virtual machine uses the configuration file to intercept messages exchanged between the application executing on each virtual machine and the operating system and to modify the messages by translating an old Internet Protocol address associated with the corresponding server in the first computing environment into a new Internet Protocol address associated with each virtual machine residing in the second computing environment, wherein the application in the second computing environment continues to use the old Internet Protocol address and an old host name used by the application in the first computing environment, and the camouflage layer intercepts the messages and modifies the messages in a manner that is transparent to the application in the second computing environment; and
      obtaining a metric indicative of the performance of the application from the plurality of virtual machines.

* * * * *